US008327968B2

(12) United States Patent
Hayashi et al.

(10) Patent No.: US 8,327,968 B2
(45) Date of Patent: Dec. 11, 2012

(54) AIR BAG SYSTEM

(75) Inventors: Takeki Hayashi, Aichi-ken (JP); Michio Inoue, Aichi-ken (JP); Shigeyuki Suzuki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 310 days.

(21) Appl. No.: 12/659,914

(22) Filed: Mar. 25, 2010

(65) Prior Publication Data
US 2010/0244413 A1 Sep. 30, 2010

(30) Foreign Application Priority Data
Mar. 31, 2009 (JP) ................................. 2009-085841

(51) Int. Cl.
*B60R 21/34* (2006.01)
(52) U.S. Cl. .................. 180/274; 280/730.1; 280/730.2
(58) Field of Classification Search .............. 280/730.2, 280/730.1; 180/274, 282; *B60R 21/34*
See application file for complete search history.

(56) References Cited

U.S. PATENT DOCUMENTS
| | | | |
|---|---|---|---|
| 7,913,794 | B2 | 3/2011 | Takahashi et al. |
| 2003/0155750 | A1 | 8/2003 | Hu et al. |
| 2009/0066069 | A1 | 3/2009 | Takahashi et al. |

FOREIGN PATENT DOCUMENTS
| | | |
|---|---|---|
| CN | 101374698 | 2/2009 |
| JP | A-10-315860 | 12/1998 |
| JP | A-2003-312361 | 11/2003 |
| JP | A-2005-041412 | 2/2005 |
| JP | A-2005-537165 | 12/2005 |
| JP | A-2006-298148 | 11/2006 |
| JP | A-2009-6957 | 1/2009 |

OTHER PUBLICATIONS

Office Action mailed Jun. 24, 2011 in corresponding CN application No. 201010141567.2 (and English translation).
Office Action dated Sep. 21, 2011 in corresponding JP Application No. 2009-085841 (and English Translation).

*Primary Examiner* — Eric Culbreth
(74) *Attorney, Agent, or Firm* — Posz Law Group, PLC (57) ABSTRACT

An air bag system M includes an air bag 40 which can cover a front surface 1a side of a front pillar 1 of a vehicle V, an inflator 55, an air bag cover 65, a case 61 which stores and holds the air bag and the inflator and holds the air bag cover, and bolts 59 which are provided so as to extend from the case for mounting the air bag system on to an installation portion of a front side door 11. A portion of an outer reinforcement 19 which reinforces an outer panel 18 of the front side door is configured as a mounting portion 20 of the front side door where the bolts are attached, and the air bag system M is installed at a portion of the front side door which lies in proximity to a belt line 14 on a side facing a vehicle's outer side by the bolts 59 being attached to the mounting portion 20 on the outer reinforcement.

6 Claims, 9 Drawing Sheets

AIR BAG SYSTEM

BACKGROUND OF THE INVENTION

1. Field of the Invention

The present invention relates to an air bag system including an air bag that can cover a front surface side of a front pillar of a vehicle.

2. Description of the Related Art

Conventionally, there have been air bag systems in which an air bag is inflated to cover a front surface side of a front pillar of a vehicle so as to prevent a pedestrian from being brought into forcible direct contact with the front pillar when the vehicle hits the pedestrian (for example, refer to Patent Document 1).

In this conventional air bag system referred to above, an air bag, which is folded, is installed at a front edge side of a front side door, and an inflator for supplying an inflation gas into the air bag is disposed in a position in the front side door below a belt line. The inflator includes a supply pipe that is connected to the air bag for supplying the inflation gas into the air bag.

Patent Document 1: JP-A-2009-6957

In the conventional air bag system, however, the air bag, which is folded for storage, is mounted at a front edge side of a sash or window frame of the front side door that is in proximity to the front pillar or in a portion in an outside rearview mirror itself. These air bag mounting portions themselves are not so rigid, and there has still been room for improvement in mounting strength with which the air bag is mounted in the front side door in order to ensure a stable inflation form of the air bag. For example, in the event that the mounting strength of the air bag which is stored in a folded condition is low, the mounting portion is deformed when the air bag inflates, and the stable air bag supporting condition cannot be ensured any longer, which makes it difficult to ensure the predetermined form of covering the front pillar.

In addition, in the conventional air bag system, a space for the supply pipe extending from the inflator is necessary, and hence, there has still been room for improvement with respect to reduction in the installation space.

SUMMARY OF THE INVENTION

The invention has been made with a view to solving the problems, and an object thereof is to provide an air bag system which can reduce the installation space and which can be installed in a front side door with ensured mounting strength.

According to the invention, there is provided an air bag system including an air bag which can cover a front surface side of a front pillar of a vehicle and adapted to be installed in a front side door at a lower end side of the front pillar at a portion lying in proximity to a belt line and on a side facing a vehicle's outer side, the air bag system comprising: the air bag; an inflator for supplying an inflation gas into the air bag; a case comprising a projection opening for allowing the air bag to project therefrom and adapted to store the air bag, which is folded, and the inflator; an air bag cover adapted to cover the projection opening in the case, having a door portion which is pushed to open by the air bag when the air bag inflates so as to allow the air bag, which is inflating, to project therefrom, and held on the case; and a mounting unit installed so as to extend from the case which holds the air bag, the inflator and the air bag cover for mounting the air bag system on an installing portion in the front side door, wherein an outer reinforcement for reinforcing an outer panel of the front side door is configured as a mounting portion in the front side door where the mounting unit is mounted, and wherein the air bag system is installed in the front side door by mounting the mounting unit at the mounting portion on the outer reinforcement by way of an opening in the outer panel.

In the air bag system according to the invention, in the event that the inflation gas is supplied from the inflator into the air bag when activated, the air bag is inflated by the inflation gas, pushes open the door portion in the air bag cover and projects from the air bag cover by way of the projection opening in the case so as to cover the front surface side of the front pillar.

In addition, the air bag system is directly mounted not at the front edge side of the window frame of the front side door or on the outside rearview mirror itself but on the highly rigid outer reinforcement which reinforces the outer panel by making use of the mounting unit which is installed so as to extend from the case which holds the air bag, the inflator and the air bag cover, and hence, the air bag system can be installed in the front side door by ensuring a sufficiently high mounting strength. Because of this, even when the air bag, which is inflating, attempts to push open the air bag cover to project from the case, the case is held on the outer reinforcement while maintaining a stable posture and the air bag is kept supported in a stable fashion. Thus, the air bag can project as designed from the air bag cover by way of the projection opening in the case so as to complete its inflation.

The inflator for supplying the inflation gas into the air bag is also held to be installed in the case which stores the air bag, which can obviate the necessity of the conventional supply pipe. Thus, the air bag system does not have to be bulky and hence can be made compact in size, thereby making it possible to reduce the installation space.

Consequently, the air bag system according to the invention can be installed in the front side door while reducing the installation space and ensuring the mounting strength.

The front side door comprises an outside rearview mirror which is installed adjacent to a rear of the air bag system, and the outside rearview mirror comprises a mirror main body which projects from the front side door towards the vehicle's outer side and a mounting base portion which holds the mirror main body and has a mounting unit for mounting the outside rearview mirror to the front side door. In this configuration, the mounting unit of the mounting base portion is also desirably mounted on the outer reinforcement by way of the opening in the outer panel of the front side door, and the mounting portion on the outer reinforcement where the mounting unit of the air bag system is mounted is desirably disposed adjacent to a front side of the mounting portion on the outer reinforcement where the mounting unit of the mounting base portion is mounted.

In this configuration, both the outside rearview mirror and the air bag system can be installed on and in the front side door with high mounting strength. The air bag system is installed at a front side of the outside rearview mirror, and hence, the air bag can cover smoothly the whole of a front surface of an area on the front pillar which extends from a lower end to an upper portion thereof when it completes its inflation, compared with the air bag system being disposed at a rear side of the outside rearview mirror. Incidentally, for example, in the event that the air bag system is disposed at the rear side of the outside rearview mirror, the lower end of the front pillar is disposed forwards of the air bag system across the outside rearview mirror. Thus, even in case the air bag attempts to inflate to cover a front surface side of the lower end of the front pillar, the air bag comes into interference (or contact) with the outside rearview mirror which is disposed in front thereof to thereby be made easy to rise from the lower end of the front pillar. Then, in the event that a front side of the air bag so rises, the air bag cannot cover the front surface side of the lower end of the front pillar any more, and hence, the air bag cannot protect a pedestrian in a stable fashion.

In addition, in the case of the air bag system being disposed at the front side of the outside rearview mirror, the air bag desirably comprises an abutment support portion which is brought into abutment with at least part of an external surface of the mirror main body for support thereon when the air bag completes its inflation, and when the air bag completes its inflation, the abutment support portion is desirably supported on the external surface of the mirror main body so as to suppress a movement of the air bag towards a vehicle's outer side direction which follows along a left-right direction.

In this configuration, when the air bag, which completes its inflation, receives a pedestrian, even in the event that the air bag is pressed strongly by the pedestrian, the air bag can be prevented from being shifted laterally towards the vehicle's outer side by the abutment support portion, so as not to be shifted from the front surface side of the front pillar, thereby making it possible to receive the pedestrian accurately.

In addition, the outside rearview mirror and the air bag system are desirably configured as an assembly member in which the outside rearview mirror and the air bag system are assembled together, and the assembly member is desirably installed in the front side door by the mounting unit of the mounting base portion and the air bag system being mounted at the adjacent mounting portions on the outer reinforcement by way of the opening in the outer panel.

In this configuration, when mounting the outside rearview mirror and the air bag system on the outer reinforcement, the outside rearview mirror and the air bag system can be handled as an integrated object for mounting, whereby the mounting work can be performed efficiently of mounting the outside rearview mirror and the air bag system on and in the front side door.

The air bag system is desirably installed in the front side door with a waterproof construction provided in which seal members are installed individually on a circumferential edge of the opening in the outer panel which is positioned on a side of the front side door which faces the vehicle's outer side and on circumferential edges of the mounting portions on the outer reinforcement which is positioned on an interior side of the front side door.

In this configuration, even in the event that the air bag system is installed in an area stretching from the outer panel which is positioned on the side facing the vehicle's outer side of the front side door which is easily exposed to rain water to an inner surface side of the outer reinforcement which is easily exposed to rain water which flows downwards along a door glass positioned in an interior of the front side door, any infiltration of rain water or foreign matters into the air bag system can be prevented by the waterproof construction, thereby making it possible to operate the air bag system in a stable fashion over a long period of time.

DESCRIPTION OF THE PREFERRED EMBODIMENTS

Figure 1:
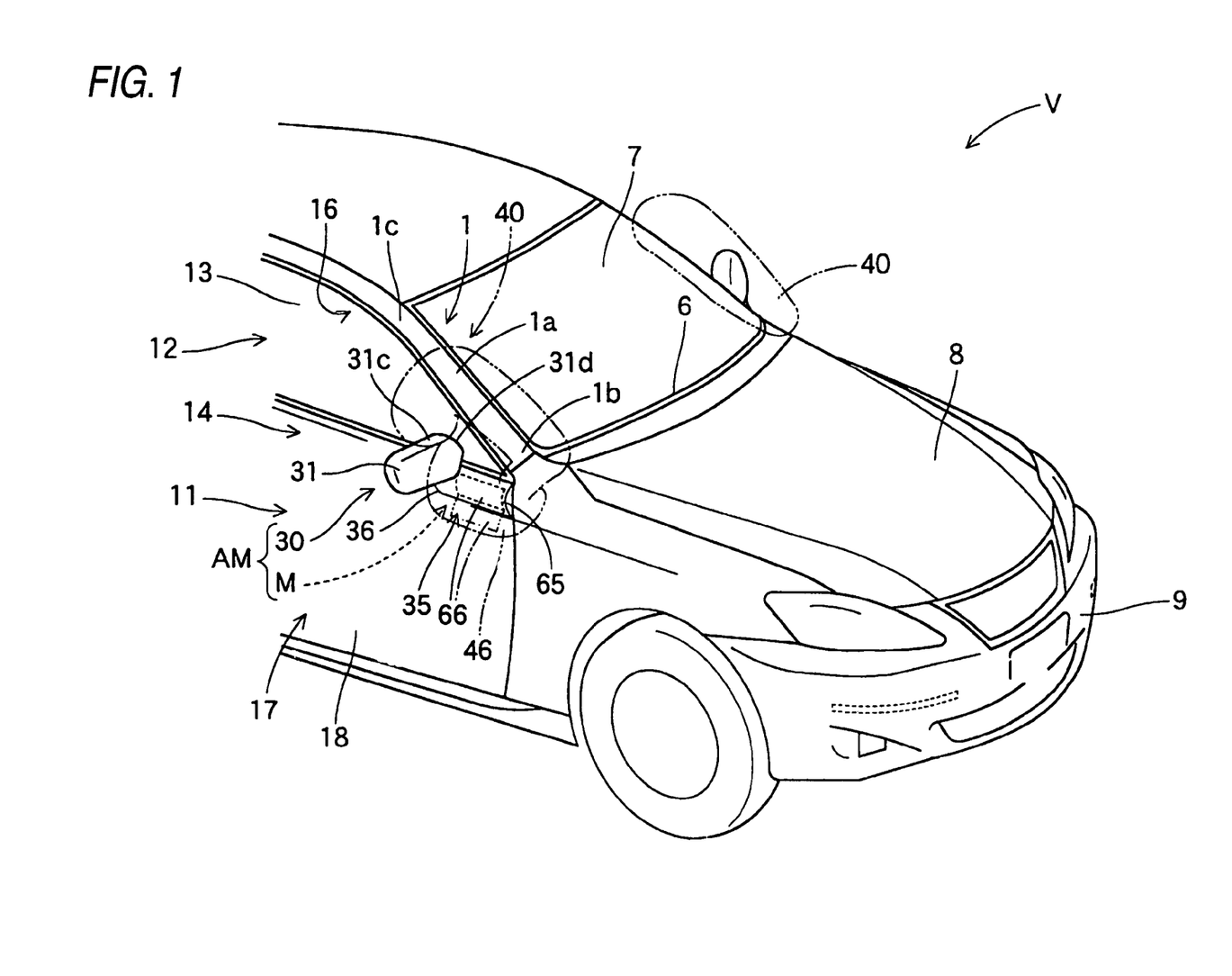
FIG. 1 is a perspective view of a vehicle showing an installing condition of an air bag system of an embodiment according to the invention, in which an air bag, which completes its inflation, is shown by chain double-dashed lines.
Figure 2:
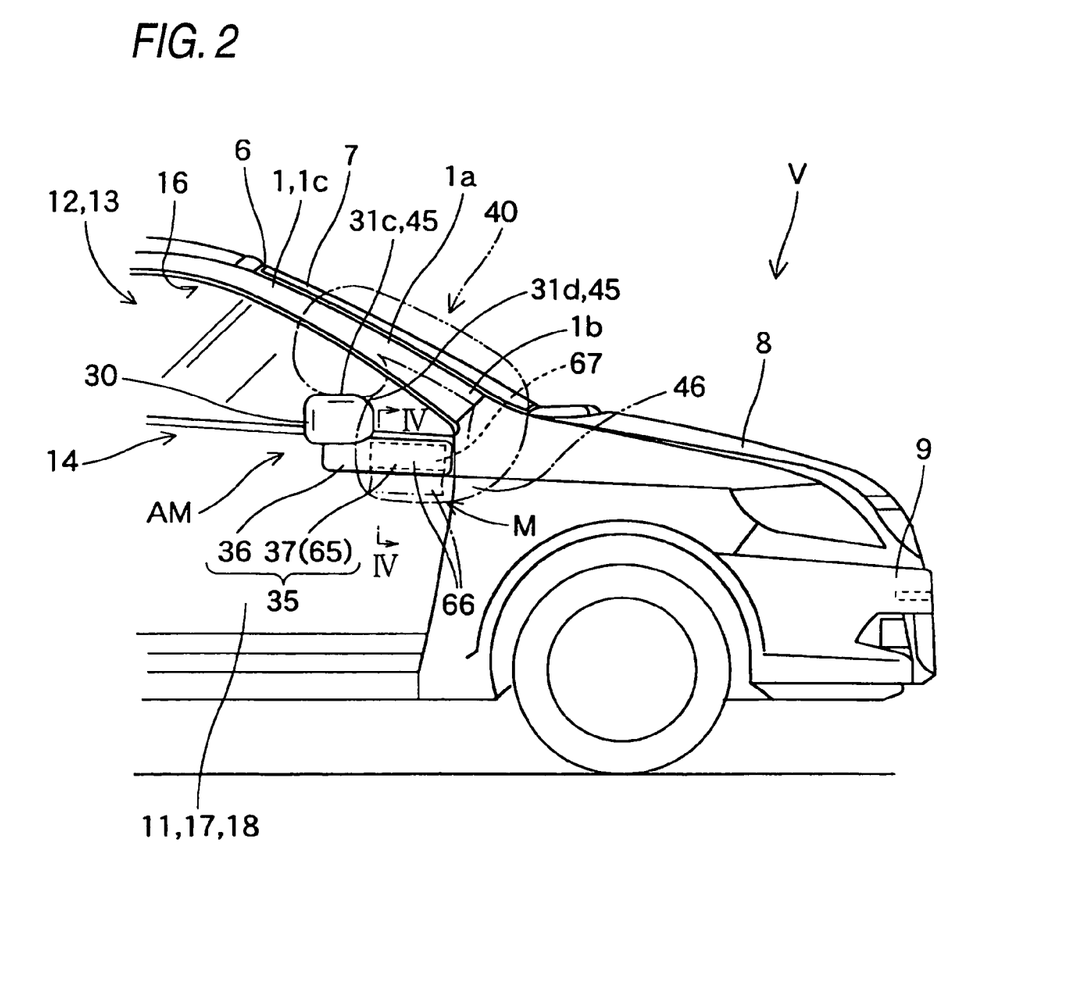
FIG. 2 is a side view of the vehicle showing the installing condition of the air bag system of the embodiment.
Figure 3:
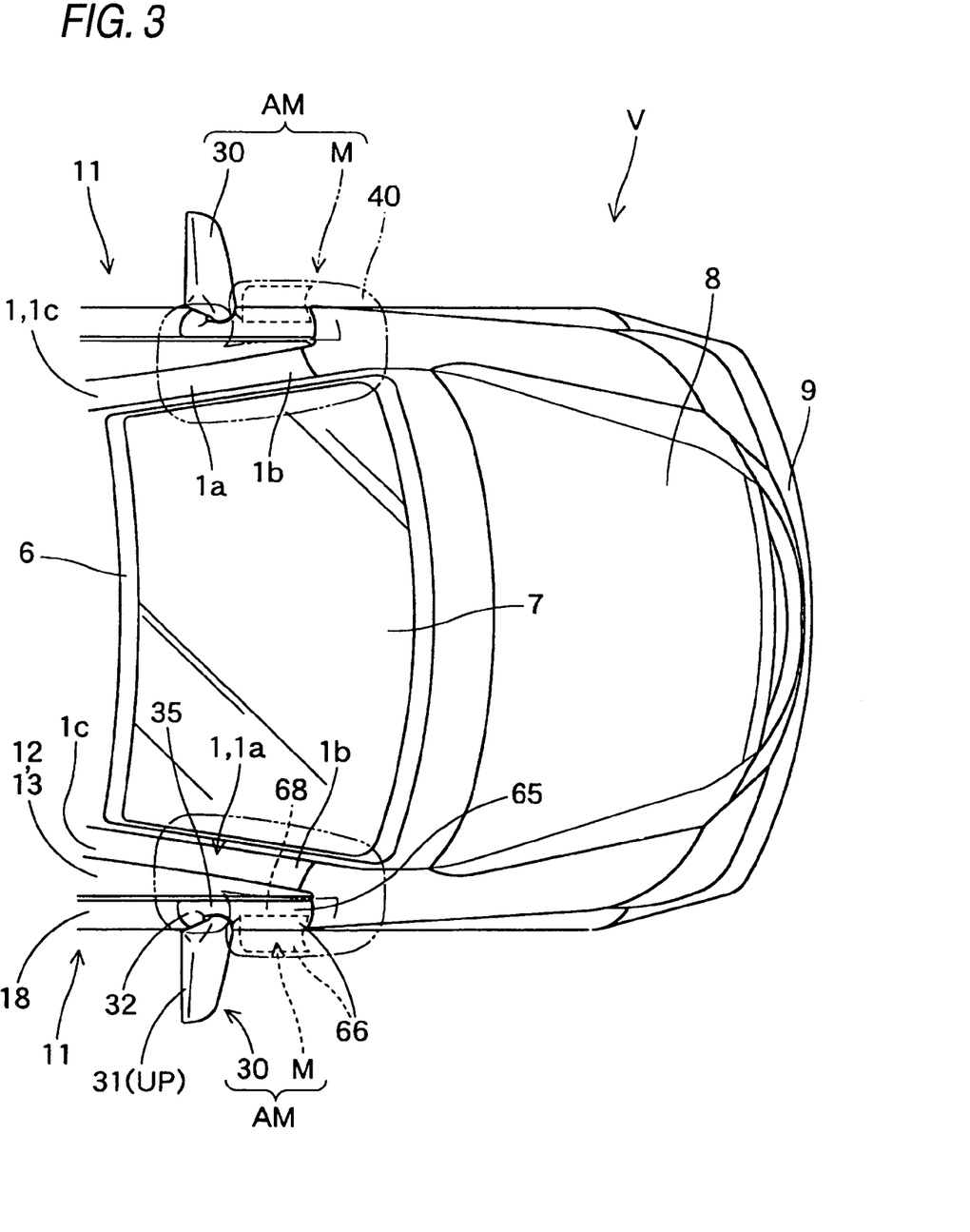
FIG. 3 is a plan view of the vehicle showing the installing condition of the air bag system of the embodiment.
Figure 9:
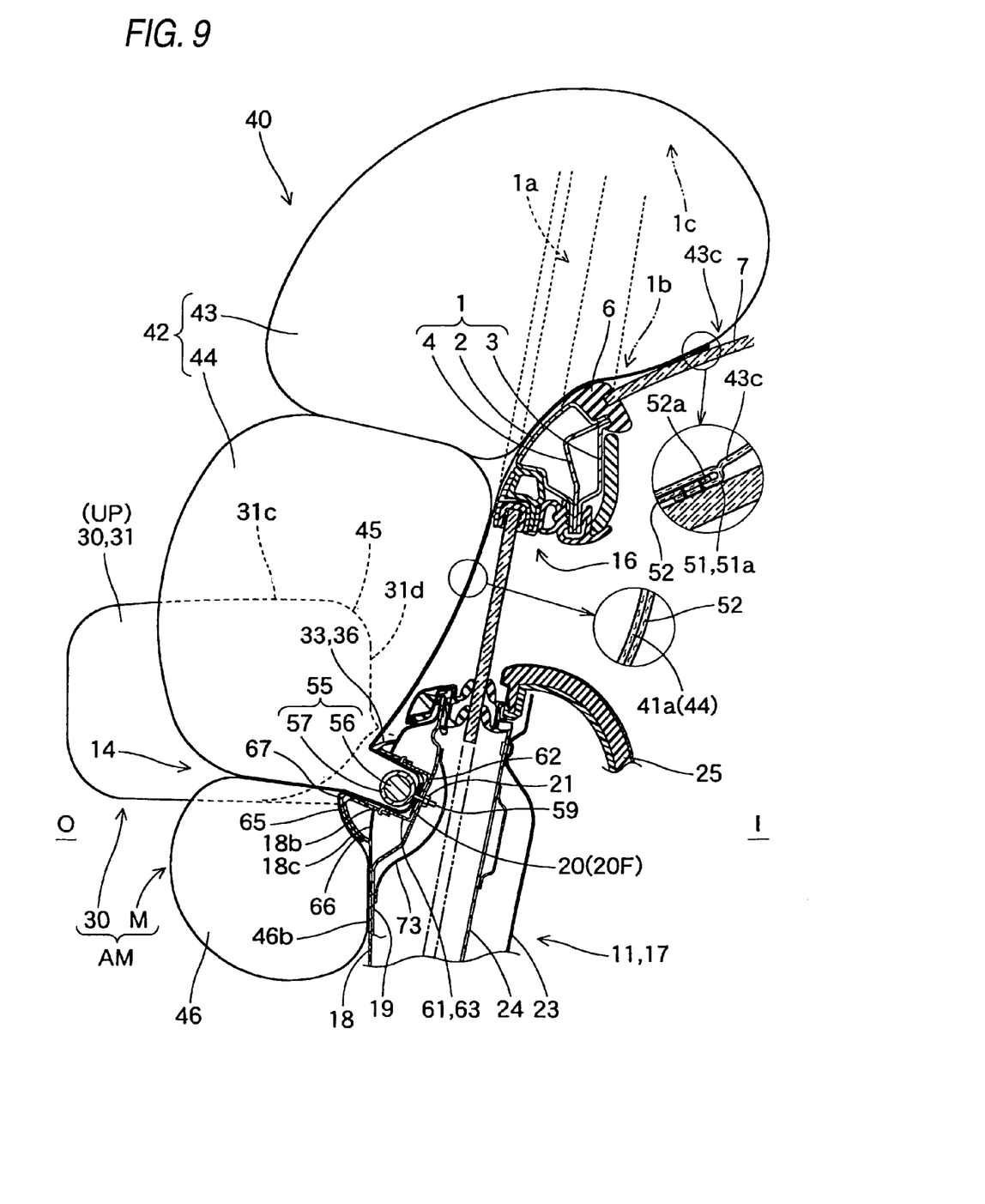
FIG. 9 is a sectional view along the left-right direction of the vehicle that shows the air bag system of the embodiment when it is activated.

Hereinafter, an embodiment of the invention will be described based on the drawings. As is shown in FIGS. 1 to 3, an air bag system M of the embodiment is installed in each of front side doors 11 which are disposed adjacent to a rear side of left and right front pillars. As is shown in FIG. 9, each of the left and right front pillars includes an outer panel 2, an inner panel 3 and a reinforcement 4 disposed between the outer panel 2 and the inner panel 3, and these panels 2, 3 and reinforcement 4 are made of sheet steel or the like. Thus, the front pillars 1 are installed as highly rigid structural members of the vehicle. In FIG. 1, a member denoted by reference numeral 6 is a window frame rubber and a member denoted by reference numeral 7 is a windshield. In addition, in FIG. 1, a member denoted by reference numeral 8 is a hood panel and a member denoted by reference numeral 9 is a front bumper.

In this specification, unless otherwise described, front-rear, vertical and left-right directions correspond, respectively, to front-rear, vertical and left-right directions of the vehicle V that is traveling straight ahead.

In addition, in this specification, the air bag system M will be described in detail that includes an air bag 40 adapted to cover a front surface side 1a of the right front pillar of the vehicle. Since the air bag system M which includes an air bag 40 adapted to cover a front surface side 1a of the left front pillar 1 of the vehicle V has an axisymmetric shape with the air bag system M for the right front pillar and is configured identically therewith, the description of the air bag system for the left front pillar will be omitted here.

The front side door 11 in which the air bag system M of this embodiment is installed is disposed adjacent to the rear side of the front pillar 1. The front side door 11 includes a side window 12 which can be opened and closed by lowering and raising a door glass 13, a sash or window frame portion 16 which surrounds the side window 12 at front, rear and upper edge thereof, and a door main body portion 17 which lies below the side window 12. A rearview mirror 30 and the air bag system M are installed on and in a portion of the door main body portion 17 which lies at a front end side of a belt line 14 which lies directly below and in proximity to the side window 12.

Figure 4:
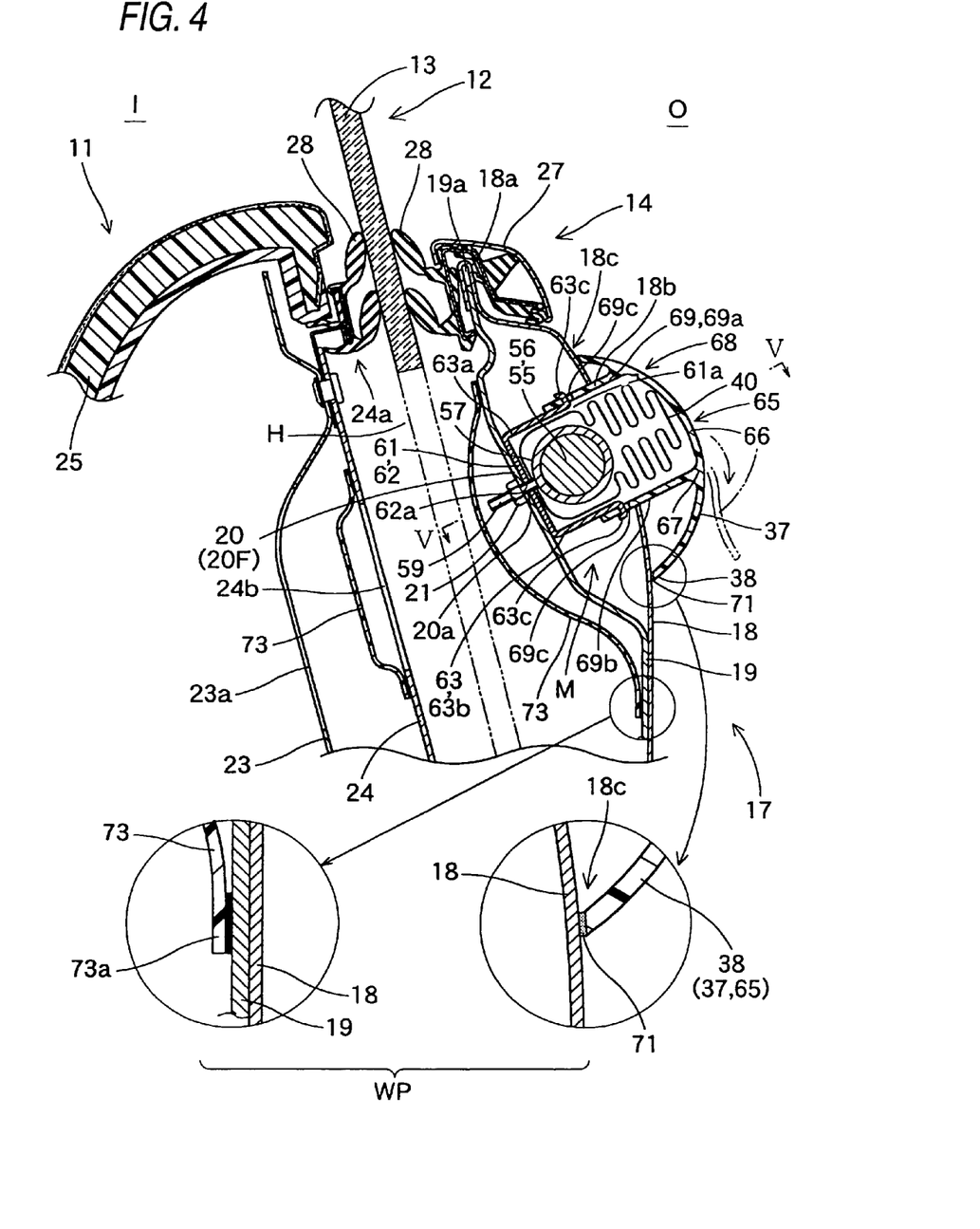
FIG. 4 is a schematic vertical sectional view along a left-right direction of a vehicle showing the installing condition of the air bag system of the embodiment, which corresponds to one taken along the line IV-IV in FIG. 2.

As is shown in FIG. 4, the door main body portion 17 includes an outer panel 18 which is disposed on a side facing a vehicle's outer side O or outer side thereof, an outer reinforcement 19 which is connected to a side facing a vehicle's inner side I or inner side of the outer panel 18 to reinforce the outer panel 18, a door trim 25 disposed on a side facing the vehicle's inner side I or inner side thereof, an inner panel 23 which is disposed on a side facing the vehicle's inner side I or inner side of the door trim 25, and an inner reinforcement 24 which is connected to a side facing the vehicle's outer side O or outer side of the inner panel 23 to reinforce the inner panel 23. The outer panel 18, the outer reinforcement 19, the inner panel 23 and the inner reinforcement 24 are formed of predetermined sheet steel or the like as required, and a space H is provided between the outer reinforcement 19 and the inner reinforcement 24 for the door glass 13 to be raised and lowered.

Weather strips 28, 28 for the door glass 13 are installed individually at upper ends 19a, 24a of the outer reinforcement 19 and the inner reinforcement 24. In addition, circumferential edges including upper ends 18a, 19a of the outer panel 18 and the outer reinforcement 19 are connected together by making use of crimping or welding, and in particular, an outer molding 27 having seal lips is fitted on the upper ends 18a, 19a so that the outer panel 18 and the outer reinforcement 19 are connected to each other so as to ensure waterproofness.

Figure 5:
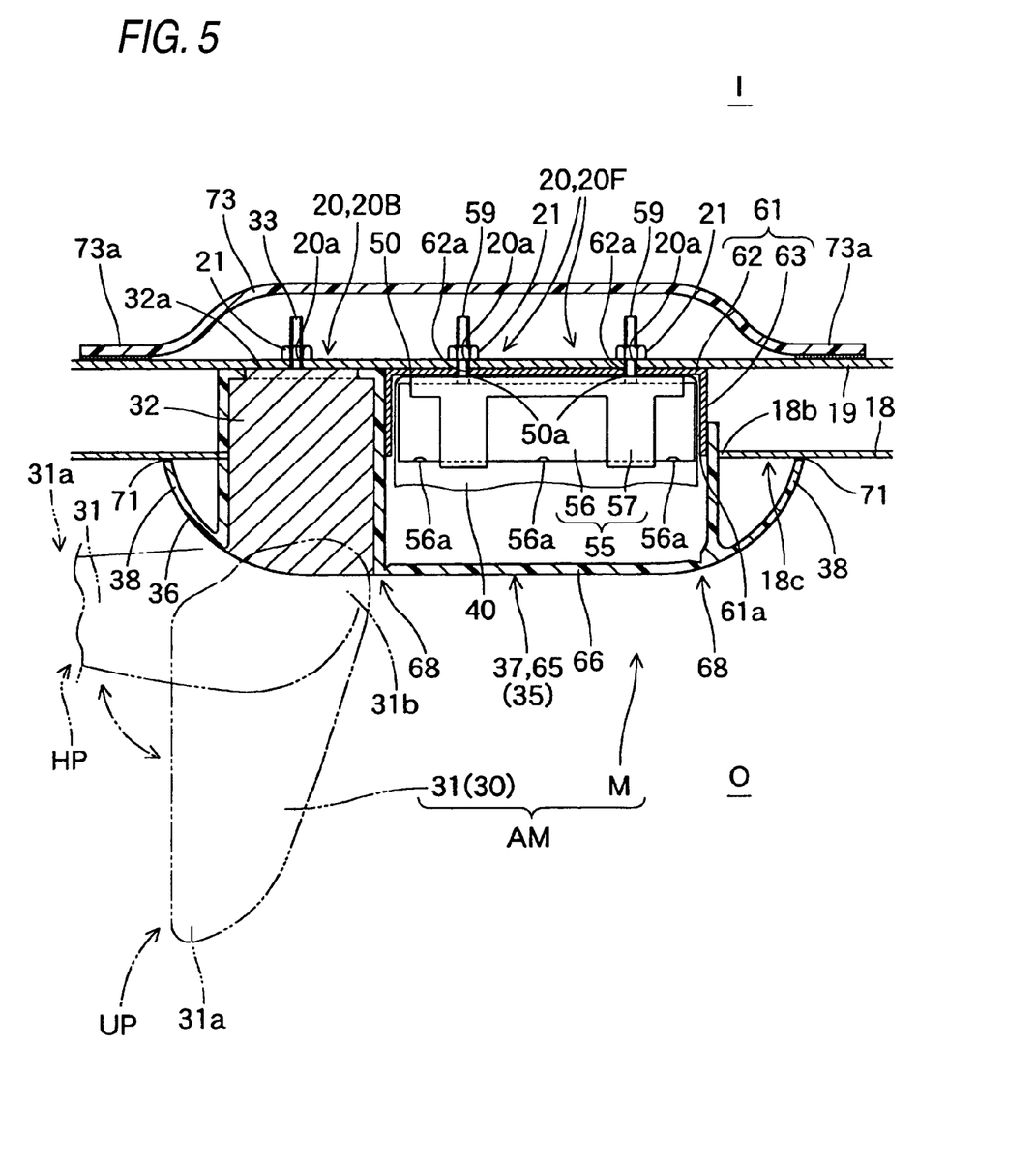
FIG. 5 is a schematic horizontal sectional view showing the installing condition of the air bag system of the embodiment, which is taken along the line V-V in FIG. 4.

In addition, as is shown in FIGS. 4, 5, an opening 18b is formed in the outer panel 18 through which the outside rearview mirror 30 and the air bag system M can be inserted. In the case of the embodiment, the opening 18b is formed a single rectangular opening through which an assembly member AM can be inserted, and the outside rearview mirror 30 and the air bag system M are integrally assembled into the assembly member AM. A portion of the outer reinforcement 19 which lies to face a side facing a vehicle's inner side I of the opening 18b in the outer panel 18 is configured as a mounting portion 20 (20F, 20B) where the assembly member AM is mounted. A plurality of (three in the embodiment) mounting holes 20a, through which the assembly member AM can be mounted on the outer reinforcement 19, are formed in the mounting portion 20. The assembly member AM is mounted at the mounting portion 20 of the outer reinforcement 19 by allowing bolts 33, 59 which extend from the assembly member AM as mounting unit to be inserted through the mounting holes 20a and then fastening nuts 21 individually on to the bolts 33, 59.

Further, working openings 23a, 24a, which are used to fasten the nuts 21 individually on to the bolts 33, 59, are formed in the inner panel 23 and the inner reinforcement 24, respectively, at portions which lie to face a side facing the vehicle's inner side I of the mounting portion 20.

Furthermore, a sheet-like seal material 73 is bonded to a perimeter of the mounting portion 20 of the outer reinforcement 19 along an outer circumferential edge 73a thereof on the side of the mounting portion 20 which faces the vehicle's inner side I, that is, the side of the mounting portion 20 which faces the space H in which the door glass 13 is raised and lowered in order to ensure the waterproofness of the mounting portion 20. This seal material 73 is bonded to the perimeter of the mounting portion 20 by making use of the working openings 23a, 24a after the nuts 21 are fastened individually on to the bolts 33, 59 which are inserted through the mounting holes 20a in the outer reinforcement 19.

As is shown in FIGS. 1 to 3 and 9, the outside rearview mirror 30 is installed in an area at the belt line 14 of the door main body portion 17 which lies below the front pillar 1 so as to be disposed adjacent to the rear of the air bag system M. As is shown in FIG. 5, the outside rearview mirror 30 includes a mirror main body 31 which projects from the front side door 11 towards the vehicle's outer side O and a mounting base portion 32 having the bolt 33 as the mounting unit for holding and mounting the mirror main body 31 on the mounting portion 20 (20B) of the outer reinforcement 19. The mounting base portion 32 includes a motor, not shown, for rotating the mirror main body 31 and holds the mirror main body 31 rotatably. In addition, the base portion 32 functions to place the mirror main body 31 in a folded position HP where a distal end 31a side of the mirror main body 31 which extends from a proximal portion 31b side thereof stays along the outer panel 18 and a use position UP where the distal end side 31a which extends from the proximal portion 31b side is directed towards the vehicle's outer side O.

The mounting base portion 32, which holds the mirror main body 31, is installed in such a state that a surface which faces the vehicle's outer side O is covered by a mirror side portion 36 of a cover member 35 which is formed integrally into the assembly member AM.

As is shown in FIGS. 1 to 3, the air bag system M is installed on a side facing the vehicle's outer side O of the portion of the front door 11 which lies at a lower end 1b side of the front pillar 1 and in proximity to the front end side of the belt line 14 and is disposed adjacent to the front of the outside rear view mirror 30. As is shown in FIGS. 4, 5, the air bag system M includes a flexible bag-like air bag 40, an inflator 55 for supplying an inflation gas into the air bag 40, an air bag cover 65, a case 61 which holds the air bag 40, the inflator 55 and the air bag cover 65, and the bolts 59 which function as the mounting unit for mounting the case 61 together with the air bag system M on the reinforcement 19.

As is shown in FIGS. 4, 5, the inflator 55 includes a cylindrical main body 56 which has a plurality of gas discharge ports 56a and extends in a front-rear direction and a diffuser 57 which surrounds and holds the main body 56 so as to grasp it. The inflator 55 is stored in an interior of the air bag 40. The plurality of (two in the case of the embodiment) bolts 59 are provided on the diffuser 57 so as to project to the outside of the air bag 40 through mounting holes 50a (refer to FIGS. 5 to 8) formed in the air bag 40. These bolts 59 are configured as the mounting unit that are inserted through mounting holes 62a formed in the case 61 so as to mount the case 61 together with the air bag system M at the mounting portion 20 (20F) of the outer reinforcement 19.

The case 61 has a substantially rectangular parallelepiped box shape having a projection opening 61a through which the air bag 40 can project and is made of sheet metal. The case 61 accommodates and holds the air bag 40, which is folded, and also holds the inflator 55, as well as the air bag cover 65. The case 61 is fixedly mounted on the outer reinforcement 19 by making use of the aforesaid bolts 59. The case 61 includes a rectangular plate-like bottom wall 62 which includes the mounting holes 62a through which the bolts 59 are inserted and a substantially quadrangular prism-like circumferential wall 63 which extends from an outer circumferential edge of the bottom wall 62 towards the vehicle's outer side O. Pluralities of locking claws 63c, each having an inverted U-shaped cross section, are formed on an upper wall and a lower wall 63b which confront each other at a top and bottom of the circumferential wall 63 for locking a mounting wall portion 69 of the air bag cover 65. The case 61 is mounted together with the inflator 55 and the air bag cover 65 on the outer reinforcement 19 by allowing the bolts 59, which function as the mounting unit extending from the diffuser 57 of the inflator 55 which is installed in the interior of the air bag 40, to be inserted through the mounting holes 20a of the outer reinforcement 19 by way of the bottom wall 62 and fastening the nuts 21 individually on to the bolts 59 so that mounting portions 50 lying along circumferential edges of the mounting holes 50a in the air bag 40 are pressed against by the diffuser. Then, the case 61 is mounted on the outer reinforcement 19 with a side stretched from the bottom wall 62 to the projection opening 61a directed obliquely upwards towards the vehicle's outer side O.

The air bag cover 65 has a substantially semi-cylindrical shape and is made of synthetic resin. The air bag cover 65 has a door portion 66 which covers the projection opening 61a in the case 61 and which is adapted to be pushed to open by the air bag 40, which is inflating, so that the air bag 40 so inflating is allowed to project therethrough. The door portion 66 is constructed to have a thin rupture anticipated portion which looks like an inverted U-shape when viewed from the vehicle's outer side O. When the door portion 66 is pushed by the inflating air bag 40, the rupture anticipated portion is allowed to be ruptured to thereby allow the door portion 66 to open downwards about a lower edge side thereof which functions as a hinge portion 67.

In addition, the air bag cover 65 includes a substantially quadrangular prism-like wall portion 69 on a rear surface side (facing the vehicle's inner side I) of a circumferential edge of the door portion 66 which extends towards the vehicle's inner side I, and pluralities of locking holes 69c are formed in an upper wall 69a and a lower wall 69b which confront each other at a top and bottom of the mounting wall portion 69 so that the respective locking claws 63c of the case 61 are inserted therethrough for locking the mounting wall portion 69.

In addition, in the case of the embodiment, the air bag cover 65 is configured as an air bag side portion 37 at a front side of the cover member 35. An outer circumferential edge of the cover member 35 is made thin to be formed into a fin portion 38 that is brought into press contact with an open circumferential edge 18c which is the circumferential edge of the opening 18b in the outer panel 18. An adhesive tape-like seal material 71 is provided at a distal end of the fin portion 38 so as to ensure the waterproofness of the open circumferential edge 18c, whereby the waterproofness between the open circumferential edge 18c and the full circumference of the outer circumferential edge of the air bag cover 65 is ensured.

As is shown in FIGS. 6 to 9, the air bag 40 includes a flexible bag-like bag main body 41, which is inflatable by an inflation gas being supplied thereinto. The bag main body 41 includes an inflatable covering portion 42 and an inflatable supporting portion 46 that is disposed on a lower surface side of the inflatable covering portion 42 when it completes its inflation. In the case of the embodiment, the air bag includes a connecting belt 52, which is configured as a separate member from the bag main body 41, and this connecting belt 52 connects the inflatable covering portion 42 with the side of the case 61.

Figure 6:
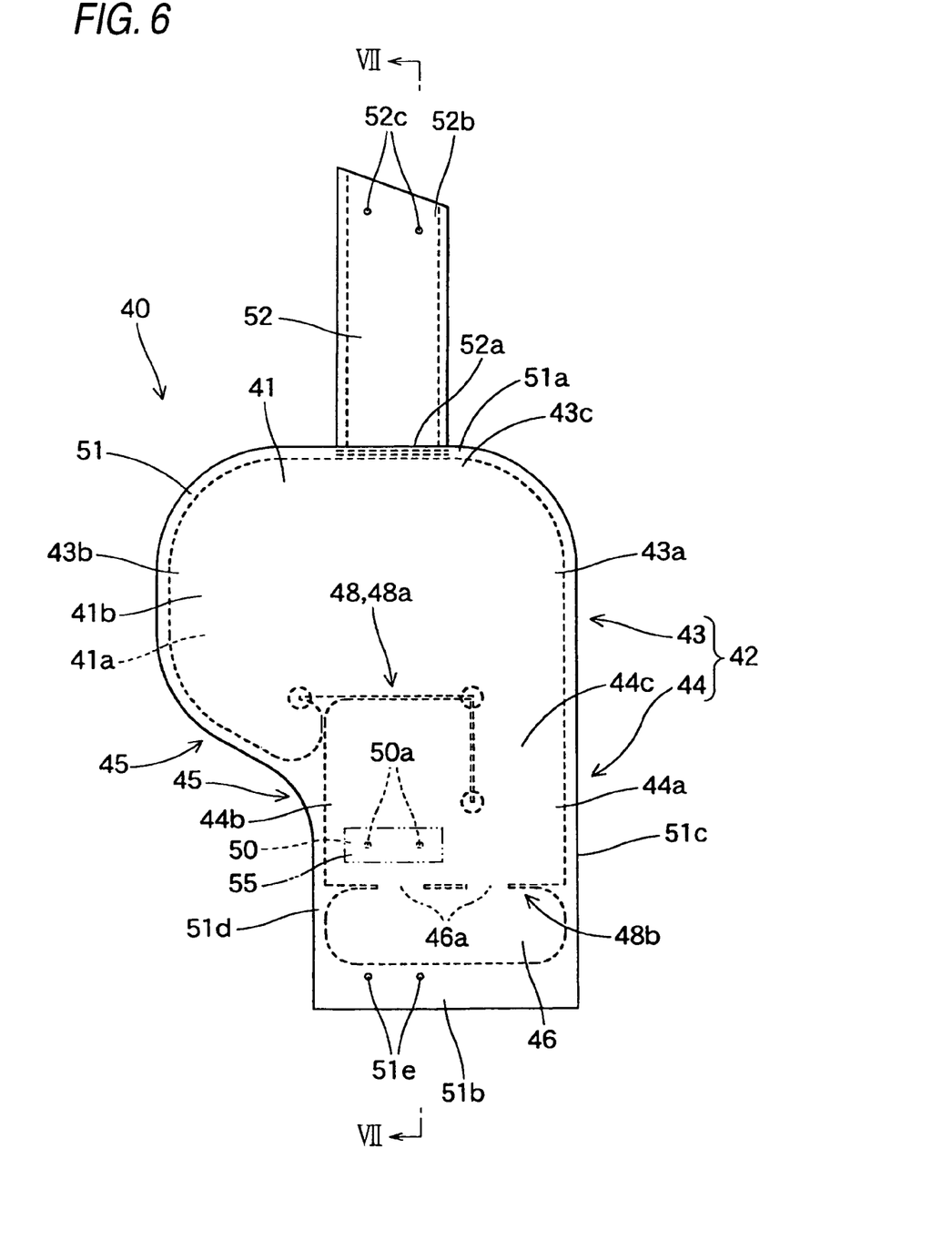
FIG. 6 is a drawing showing a condition in which the air bag used in the embodiment is deployed flat.

The bag main body 41 has a vehicle body side panel 41a which is disposed on a front pillar 1 side and an outer side panel 41b which is disposed on a side thereof which is opposite to the vehicle body side panel 41a when the bag main body 41 completes its inflation. The bag main body 41 is formed into a flat bag in which outer circumferential edges of the vehicle body side panel 41a and the outer side panel 41b, which both deploy flat, are joined to each other by a circumferential closure portion 51 and predetermined portions of the vehicle body side panel 41a and the outer side panel 41b which both lie on an inner side of the bag main body 41 are joined to each other by a dividing closure portion 48. In the case of the embodiment, the bag main body 41 is woven into a bag of polyester fibers or polyamide fibers through hollow weave.

The inflatable covering portion 42 includes a pillar covering portion 43 which can cover a portion on the front side 1a of the front pillar 1 which extends from the lower end 1b towards an upper end 1c side of the front pillar 1 and an inflatable connecting portion 44 in which a length dimension in the front-rear direction of a side which lies to face a lower side of the pillar covering portion 43 is made shorter than the pillar covering portion 43. The pillar covering portion 43 and the inflatable connecting portion 44 are stretched continuously in a linear fashion from each other as if extending in a vertical direction at front edges 43a, 44a sides thereof, and a rear edge 44b side of the inflatable connecting portion 44 is configured as being recessed further forwards than a rear edge 43b of the pillar covering portion 43 so as to be brought into press contact with a portion on an external surface (an inner surface 31d and an upper surface 31c) of the mirror main body 31 of the outside rear view mirror 30 which lies in the vicinity of the rear edge 44b side of the inflatable connecting portion 44.

The inflatable connecting portion 44 incorporates the inflator 55 in an interior thereof, and the mounting portion 50, where the air bag 40 is mounted on the case 61 and the outer reinforcement 19 by the bolts 59 which extend from the diffuser 57 of the inflator 55, is provided at a lower end side of the inflatable connecting portion 44. The mounting portion 50 includes the mounting holes 50a through which the bolts 59 are inserted in a portion on the vehicle body side panel 41a of the inflatable connecting portion 44. The inflatable connecting portion 44 is installed to support the pillar covering portion 43 from the vicinity of the mounting portion 50 so that the pillar covering portion 43 can cover a whole surface of the lower end 1b side of the front pillar 1 which is spaced far apart from the mounting portion 50. In addition, the inflatable connecting portion 44 includes between the pillar covering portion 43 and itself an upper closure portion 48a of the dividing closure portion 48 which extends from rear edges 43b, 44b sides to the front and then downwards so as to be formed into an inverted L-shape, whereby the inflatable connecting portion 44 is separated from the pillar covering portion 43. A vertical cell portion 44c is provided at a front side of the upper closure portion 48a without being separated by the dividing closure portion 48. This vertical cell portion 44c is adapted, when it inflates, to inflate into a vertical rod-like shape so as to connect the inflatable connecting portion 44 with the pillar covering portion 43 vertically linearly to thereby support the pillar covering portion strongly and rigidly.

In the inflatable connecting portion 44, a portion lying in proximity to the rear edge 44b on the side facing the vehicle body side panel 41a is adapted to be brought into abutment with the upper surface 31c and the inner surface 31d, which face the door glass 13, of the external surface of the mirror main body 31 of the outside rearview mirror 30 when the air bag 40 inflates, and this portion of the inflatable connecting portion 44 is configured as an abutment support portion 45 which can suppress a movement (lateral shifting) of the pillar covering portion 43 towards the vehicle's outer side O in a left-right direction.

The inflatable supporting portion 46 is disposed below the inflatable connecting portion 44 while being separated therefrom by a lower closure portion 48b of the dividing closure portion 48. The lower closure portion 48b is provided intermittently while extending along the front-rear direction so as to connect a front edge 51c with a rear edge 51d of the circumferential closure portion 51. In the inflatable supporting portion 46, portions that are not closed by the lower closure portion 48b are configured as inlet ports 46a through which an inflation gas is allowed to flow thereinto from the inflatable connecting portion 44.

Figure 7:
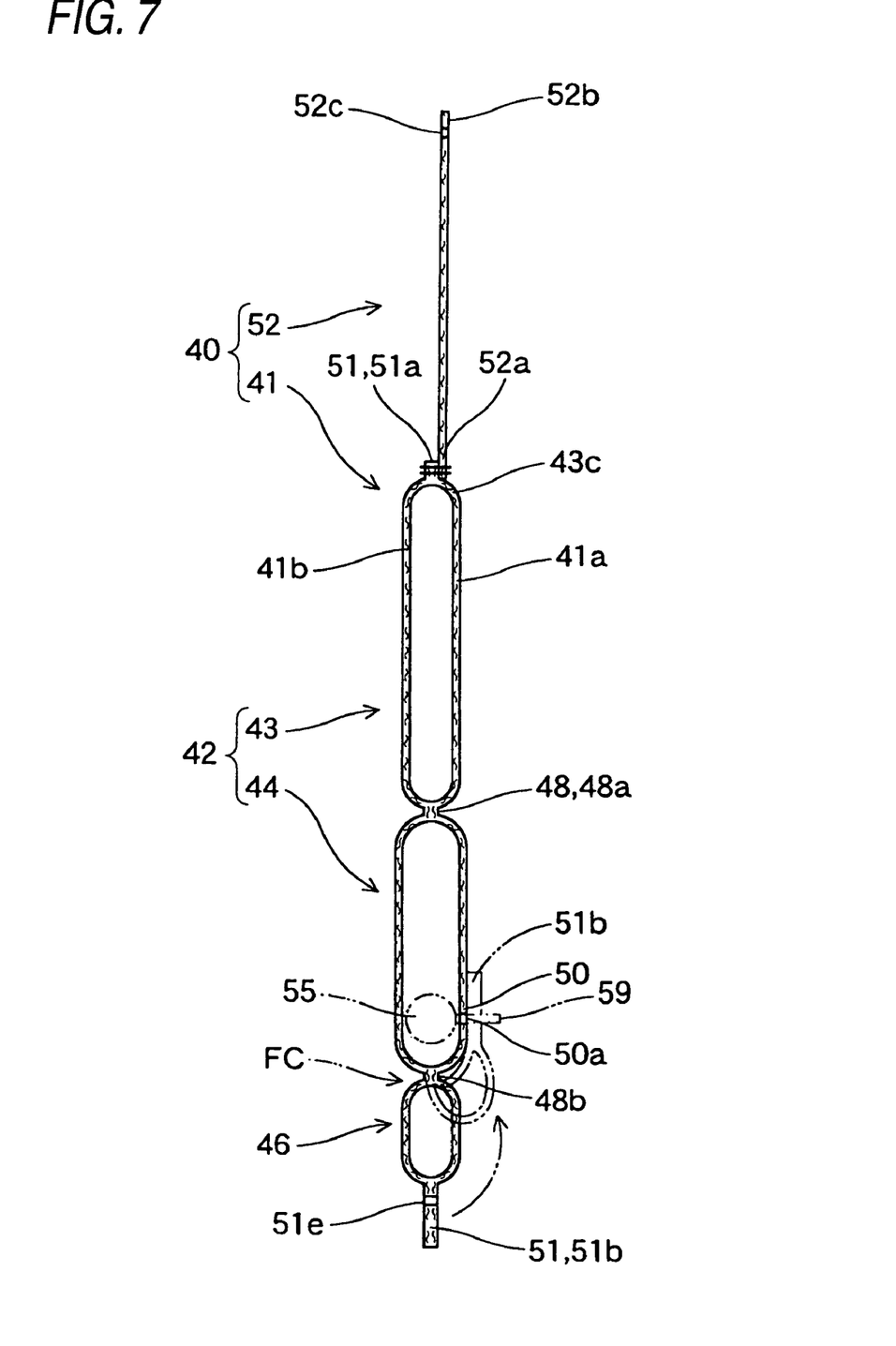
FIG. 7 is a vertical sectional view of the air bag of the embodiment that is taken along the line VII-VII in FIG. 6.
Figure 8:
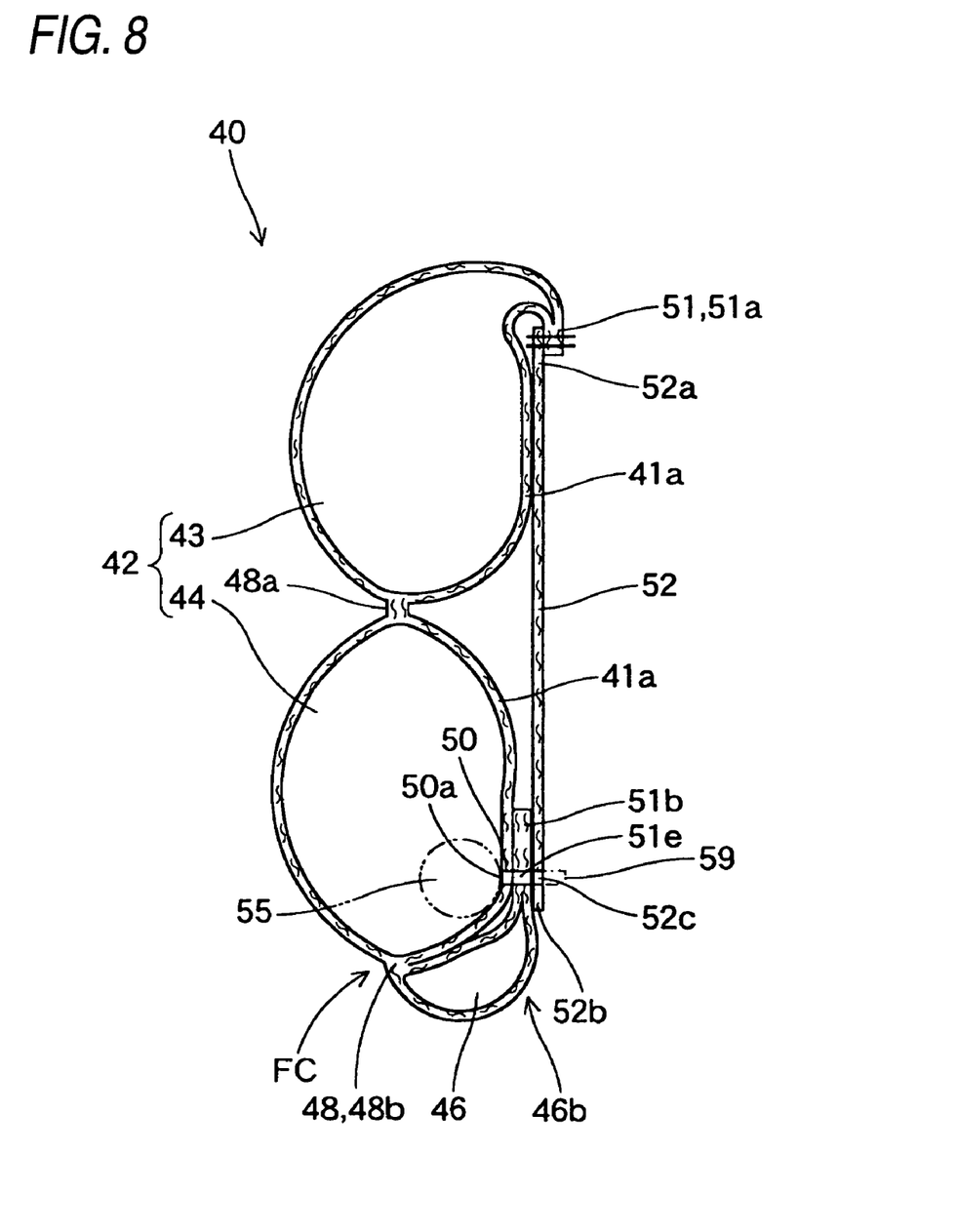
FIG. 8 is an enlarged vertical sectional view showing a condition in which the air bag of the embodiment is inflated alone with an inflatable supporting portion of the air bag folded.

When the air bag 40 is folded, this inflatable supporting portion 46 is, as is shown in FIGS. 7, 8, connected to the mounting portion by making use of the bolts 59 by being folded at a folding line FC provided in proximity to the lower closure portion 48b so that a lower edge of the circumferential closure portion 51 approaches the vicinity of the mounting portion 50 lying on the side which faces the vehicle body side panel 41a of the inflatable connecting portion 44 and inserting the bolts 59 of the diffuser 57 through connecting holes 51e which are provided at the lower edge 51b. In this way, by connecting the inflatable supporting portion 46 to the mounting portion 50 on the side facing the vehicle body side panel 41, when the air bag 40 inflates, the inflatable supporting portion 46, which is so folded, is allowed to distend to face the vehicle's inner side I so as to be brought into abutment with the outer panel 18 or the air bag cover 65 to thereby support the inflatable connecting portion 44 from a lower surface side thereof as done by a wedge. Thus, the inflatable connecting portion 44 can prevent the pillar covering portion 43 from being shifted downwards or towards the vehicle's outer side O at the portion where the mirror main body 31 of the outside rearview mirror 30 is not disposed.

As is shown in FIGS. 6, 7, in the connecting belt 52, a proximal portion 52a is connected to an upper edge 51a of the circumferential closure portion 51 by making use of stitching or the like. As is shown in FIG. 8, when the air bag 40 is folded, the connecting belt 52 is connected to the mounting portion 50 at a distal end portion 52b, which is spaced apart from the proximal portion 52a, by making use of the bolts 59 by inserting the bolts 59 through the connecting holes 51e provided at the distal end portion 52b. The connecting belt 52 is provided to press down the pillar covering portion 43 so as not to rise from the front surface 1a of the front pillar when the air bag 40 inflates, as well as to pull an upper edge 43c of the pillar covering portion 43 towards the side of the mounting portion 50 on the side facing the vehicle body side panel 41a. Because of this, a length dimension of the connecting belt 52 from the proximal portion 52a to the distal end portion 52b is set to such a dimension that enables the connecting belt 52 to pull the pillar covering portion 43 at the upper edge 43c in the way described above.

In the case of the embodiment, the air bag 40 is folded into a predetermined shape which can be stored within the case 61 by installing the inflator 55 at the mounting portion 50 in the inflatable connecting portion 44 by way of a slit-like assembling hole, not shown, which is provided in the mounting portion 50 with the bolts 59 of the diffuser 57 allowed to project from the mounting holes 50a, folding the inflatable supporting portion 46 on to the inflatable connecting portion 44 and connecting the lower edge 51b of the circumferential closure portion 51 to the mounting portion 50 by making use of the bolts 59 and the connecting holes 51e. Then, in the air bag 40 so folded, the distal end portion 52b of the connecting belt 52 is connected to the mounting portion 50 by making use of the bolts 59 and connecting holes 52c, and the air bag 40 so folded is then stored within the case 61 with the bolts 59 allowed to project from the bottom wall 62. Following this, the mounting wall portion 69 of the air bag cover 65 of the cover member 35, which covers the outside rearview mirror 30 that has been installed accordingly, is locked by the locking claws 63c, so that the air bag cover 65 is assembled on to the case 61, whereby the assembling member AM can be formed.

Then, the assembly member AM is inserted from the rectangular opening 18b formed for the passage of the assembly member AM in the outer panel 18 towards the side of the outer reinforcement 19 with the bolts 33, 59, which functions as the mounting unit, leading the way towards the outer reinforcement 19. Then, the respective bolts 33, 59 are inserted individually through the mounting holes 20a, and the bottom wall 62 of the case 61 and the bottom portion 32a of the mounting base portion 32 are brought into abutment with the mounting portion 20 of the outer reinforcement 19. Then, the nuts 21 are fastened individually on to the bolts 33, 59. Thus, the assembly member AM into which the air bag system M and the outside rearview mirror 30 are integrated can be mounted on the mounting portion 20 of the outer reinforcement 19 integrally.

It should be noted that the predetermined seal material 71 is affixed to the fin portion 38 on the outer circumferential edge of the cover member 35 before the assembly member AM is inserted through the opening 18b in the outer panel 18. Because of this, since the case 61 and the mounting base portion 32 are fastened so as to be moved towards the vehicle's inner side I when the nuts 21 are individually fastened on to the bolts 33, 59, the fin portion 38 is pressed against the open circumferential edge 18c of the outer panel 18, thereby making it possible to improve further the waterproofness produced by the seal material 71.

After the assembly member AM has been mounted on the outer reinforcement 19, the seal material 73 is affixed to cover the side facing the vehicle's inner side I of the mounting portion 20 of the outer reinforcement 19 by making use of the working openings 23a, 24a which were used in fastening the nuts 21 on the bolts 33, 59. Further, a sheet-like seal material 75 is also affixed to close the working opening 24a of the inner reinforcement 24 so as to prevent the infiltration of rain water flowing down along the door glass 13 into the side of the door trim 25. Then, the door trim 25 is assembled into the front side door 11, and the front side door 11 so assembled is then assembled on to a vehicle V, whereby the air bag system M can be installed in the vehicle V.

Lead wires, not shown, for activating the inflator 55 and a motor installed in the mounting base portion 32 of the outside rearview mirror 30 are laid out on a lower side of the air bag 40 where waterproofness is easy to be ensured when the assembly member AM is mounted on to the outer reinforcement 19. Then, the lead wires may be connected together with lead wires for activating a motor which raises and lowers the door glass 13 to a predetermined control unit when the front side door 11 is assembled on to the vehicle V.

Then, when the air bag system M of the embodiment is activated after it has been installed in the vehicle V so that an inflation gas is supplied into the air bag 40 from the gas discharge ports 56a of the main body 56 of the inflator 55, the air bag 40 inflates due to the inflation gas so supplied, push opens the door portion 66 of the air bag cover 65 and projects from the air bag cover 65 by way of the projection opening 61a in the case 61 so as to cover the front surface 1a side of the front pillar 1.

The air bag system M of the embodiment is mounted not at a front edge side of the window frame of the front side door or on the outside rearview mirror itself but directly on the highly rigid outer reinforcement 19 which reinforces the outer panel 18, whereby the air bag system can be installed in the front side door 11 while ensuring a sufficiently high mounting strength. Because of this, even when the air bag 40, which is inflating, attempts to push open the air bag cover 65 to project from the case 61, the case 61 is held on to the outer reinforcement 19 while maintaining the stable posture, and the air bag 40 projects from the air bag cover 65 by way of the projection opening 61a in the case 61 while maintaining the stable supported condition, so as to complete its inflation.

The inflator 55 for supplying the inflation gas into the air bag 40 is also held in the case 61 which stores the air bag 40, and this obviates the necessity of the conventional inflation gas supply pipe, which prevents the air bag 40 from getting bulky. Thus, the air bag system M can be made compact in size. In particular, in the case of the embodiment, the inflator 55 is stored within the air bag 40, which makes the air bag system M more compact in size. Further, the diffuser 57 of the inflator 55 includes the bolts 59 which functions as the mounting unit for mounting the inflator 55 on to the outer reinforcement 19. This enables both the inflator 55 and the air bag 40 to be fastened together by the bolts 59 for mounting on the outer reinforcement 19, and hence, this configuration eliminates the necessity of any separate mounting unit for mounting on to the case 61 of the air bag 40. Thus, the air bag system M can be made more compact.

Consequently, the air bag system M of the embodiment can be installed in the front side door 11 while making the installation space smaller and ensuring the mounting strength.

In addition to the bolts ant nuts, rivets can be used as the mounting unit for mounting the air bag system M on to the outer reinforcement 19. In addition to the bolts 59 extending from the inflator 55 as in the case of the embodiment, bolts extending from the case 61 itself may be used as a mounting unit.

In this embodiment, the front side door 11 includes the outside rearview mirror 30 that is installed adjacent to the rear of the air bag system M. The outside rearview mirror 30 includes the mirror main body 31 which projects from the front side door 11 towards the vehicle's outer side O and the mounting base portion 32 which holds the mirror main body 30 and has the bolt 33 as the mounting unit for mounting the mirror main body 30 on to the front side door 11. Further, the bolt 33 of the mounting base portion 32 is also attached to the outer reinforcement 19 by way of the opening 18b in the outer panel 18. Furthermore, the mounting portion 20 (20F) of the outer reinforcement 19 to which the bolts 59 functioning as the mounting unit of the air bag system M are attached is disposed adjacent to the front side of the mounting portion 20 (20B) of the outer reinforcement 10 to which the bolt 33 of the mounting base portion 32 is attached.

Because of this configuration, both the outside rearview mirror 30 and the air bag system M can be installed on and in the front side door 11 with high mounting strength. The air bag system M is installed at the front side of the outside rearview mirror 30, and when it completes its inflation, the air bag 40 can cover smoothly the area on the front surface 1a of the front pillar 1 which extends upwards from the lower end 1b, compared with the case where the air bag 40 is disposed at the rear side of the outside rearview mirror 30. Incidentally, for example, in the event that the air bag system is disposed at the rear side of the outside rearview mirror 30, it means that the lower end 1b of the front pillar 1 is disposed further forwards than the outside rearview mirror 30 thereacross when looking at the front pillar 1 from the air bag system. Thus, even in the event that the air bag attempts to inflate to cover the front surface 1a side of the lower end 1b of the front pillar 1, the air bag comes into interference (contact) with the outside rearview mirror 30 which is disposed thereahead, as a result of which the air bag is made easy to rise from the lower end 1b of the front pillar 1. In case the front side of the air bag rises, the air bag cannot cover the front surface side 1a of the lower end 1b of the front pillar 1, whereby the air bag is not allowed to protect a pedestrian in a stable fashion.

In contrast, in the event that the air bag system M is installed at the front side of the outside rearview mirror 30, the air bag 40 includes the abutment support portion 45 which is brought into abutment with at least part of the external surface of the mirror main body 31 (in the case of the embodiment, the upper surface 31c and the inner surface 31d) to thereby be supported thereon when the air bag 40 completes its inflation. Thus, when the air bag 40 completes its inflation, the abutment support portion 45 is supported on the external surface (the upper surface 31c and the inner surface 31d) of the mirror main body 31, whereby the air bag 40 is restrained from moving towards the vehicle's outer side O in the left-right direction. Because of this, in the air bag system M of the embodiment, when the air bag 40, which has completed its inflation, receives a pedestrian, even in the event that the air bag 40 is pressed strongly by the pedestrian, the air bag 40 can be prevented from being shifted laterally, and hence, the air bag 40 is not shifted from the front surface 1a side of the front pillar, thereby making it possible to receive the pedestrian accurately.

In the embodiment, while the portion on the mirror main body 31 where the abutment support portion 45 of the air bag 40 is brought into abutment for support thereon is described as being made up of the two surfaces, the upper surface 31c and the inner surface 31d, the portion in question may be made up of either of the upper surface 31c and the inner surface 31d, provided that the lateral shifting of the air bag 40 towards the vehicle's outer side can be prevented by the abutment support portion 45.

In the embodiment, the outside rearview mirror 30 and the air bag system M are assembled together into the assembly member AM, and the assembly member AM is installed in the front side door 11 by attaching the bolts 33, 59, which function as the mounting unit for the mounting base portion 32 and the air bag system M, to the adjacent mounting positions 20B, 20F of the outer reinforcement 19, respectively, by way of the opening 18b provided in the outer panel 18. Because of this, in the embodiment, when mounting the outside rearview mirror 30 and the air bag system M on to the outer reinforcement 19, they can be mounted as an integral member, which is the assembly member AM, thereby making it possible to perform the installation work of installing the outside rearview mirror 30 and the air bag system M on and in the front side door 11 with efficiency.

In the assembly member AM into which the outside rearview mirror 30 and the air bag system M are integrated, only the cover member 35 may be used commonly over which the mirror side portion 36 and the air bag side portion 37 stretch. In association with the cover member 35, the mounting base portion 32 and the case 61 or the mounting base portion 32 and the inflator 55 may be joined to each other so as to be configured as an assembly member.

In the embodiment, the air bag system M is installed in the front side door 11 with a waterproof construction WP provided in which the seal materials 71, 73 are provided, respectively, at the open edge 18b of the outer panel 18 which lies on the side of the front side door 11 which faces the vehicle's outer side O and the circumferential edge of the mounting portion 20 of the outer reinforcement panel 19 which lies on the side of the front side door 11 which faces the vehicle's inner side I. Because of this, in the embodiment, even in the event that the air bag system M is installed in a space stretching between the outer panel 18 lying on the side facing the vehicle's outer side O of the front side door 11 where the air bag system M is easy to be exposed to rain water to an inner surface side of the outer reinforcement 19 where the air bag system M is easy to be exposed to rain water that flows down by way of a portion of the door glass 13 that remains in the interior of the front side door 11, the infiltration of rain water and foreign matters into an interior of the air bag system M can be prevented by the waterproof construction WP, whereby the air bag system M can be kept active in a stable fashion over a long period of time.

In particular, in the embodiment, the outside rearview mirror 30 and the air bag system M are assembled together into the assembly member AM, and waterproofness at the upper ends 18a, 19a of the outer panel 18 and the outer reinforcement 19, where rain water is understood to easily infiltrate the space between the outer panel 18 and the outer reinforcement 19, is ensured by the outer molding 27. Thus, as the waterproof construction WP for the assembly member AM, only the two seal materials may be used which are the seal material 71 on the side of the outer panel 18 of the front side door 11 which faces the vehicle's outer side O and the seal material 73 on the side of the outer reinforcement 19 which faces the interior of the front side door 11, whereby the air bag system M can be made simpler in construction.

What is claimed is:

1. An air bag system that is capable of covering a front surface side of a front pillar of a vehicle and adapted to be installed in a front side door at a lower end side of the front pillar at a portion lying in proximity to a belt line, the air bag system comprising:
an air bag;
an inflator supplying an inflation gas into the air bag;
a case comprising a projection opening for allowing the air bag to project from the case and adapted to store the air bag which is folded and the inflator;
an air bag cover adapted to cover the projection opening in the case, having a door portion pushed to open by the air bag when the air bag inflates so as to allow the air bag which is inflating to project from the door portion and held on the case; and
a mounting unit installed so as to extend from the case which holds the air bag, the inflator and the air bag cover for mounting the air bag system on an installing portion in the front side door;
wherein
an outer reinforcement for reinforcing an outer panel of the front side door is configured as a mounting portion in the front side door where the mounting unit is mounted, and wherein the air bag system is installed in the front side door by mounting the mounting unit at the mounting portion on the outer reinforcement by an opening in the outer panel, and
the air bag system is installed at a front end side of the belt line which lies directly below and in proximity to a side window of the front side door.

2. The air bag system as set forth in claim 1, wherein the air bag system is installed in the front side door with a waterproof construction provided in which seal members are installed individually on a circumferential edge of the opening in the outer panel which is positioned on a side of the front side door which faces the vehicle's outer side and on circumferential edges of the mounting portions on the outer reinforcement which is positioned on an interior side of the front side door.

3. The air bag system as set forth in claim 1, wherein
the air bag cover is installed at the front end side of the belt line.

4. An air bag system that is capable of covering a front surface side of a front pillar of a vehicle and adapted to be installed in a front side door at a lower end side of the front pillar at a portion lying in proximity to a belt line, the air bag system comprising:
an air bag;
an inflator supplying an inflation gas into the air bag;
a case comprising a projection opening for allowing the air bag to project from the case and adapted to store the air bag which is folded and the inflator;
an air bag cover adapted to cover the projection opening in the case, having a door portion pushed to open by the air bag when the air bag inflates so as to allow the air bag which is inflating to project from the door portion and held on the case; and
a mounting unit installed so as to extend from the case which holds the air bag, the inflator and the air bag cover for mounting the air bag system on an installing portion in the front side door;
wherein
an outer reinforcement for reinforcing an outer panel of the front side door is configured as a mounting portion in the front side door where the mounting unit is mounted, and wherein the air bag system is installed in the front side door by mounting the mounting unit at the mounting portion on the outer reinforcement by an opening in the outer panel, and
the front side door comprises an outside rearview mirror that is installed adjacent to a rear of the air bag system, wherein the outside rearview mirror comprises a mirror main body which projects from the front side door towards the vehicle's outer side and a mounting base portion which holds the mirror main body and has a mounting unit mounting the outside rearview mirror to the front side door, wherein the mounting unit of the mounting base portion is mounted on the outer reinforcement by way of the opening in the outer panel of the front side door, and wherein the mounting portion on the outer reinforcement where the mounting unit of the air bag system is mounted is disposed adjacent to a front side of the mounting portion on the outer reinforcement where the mounting unit of the mounting base portion is mounted.

5. The air bag system as set forth in claim 4, wherein the air bag comprises an abutment support portion which is brought into abutment with at least part of an external surface of the mirror main body for support thereon when the air bag completes its inflation, and wherein when the air bag completes its inflation, the abutment support portion is supported on the external surface of the mirror main body so as to suppress a movement of the air bag towards a vehicle's outer side direction which follows along a left-right direction.

6. The air bag system as set forth in claim 4, wherein the outside rearview mirror and the air bag system are configured as an assembly member in which the outside rearview mirror and the air bag system are assembled together, and wherein the assembly member is installed in the front side door by the mounting unit of the mounting base portion and the air bag system being mounted at the adjacent mounting portions on the outer reinforcement by the opening in the outer panel.

* * * * *